United States Patent
Deslandes et al.

(10) Patent No.: US 9,187,836 B2
(45) Date of Patent: Nov. 17, 2015

(54) SYMMETRIC ELECTROCHEMICAL CELL

(75) Inventors: Max Deslandes, Les Essarts le Roi (FR); Jean-Christophe Pruvost, Puteaux (FR); Arash Mofakhami, Buthiers (FR); Philippe Planard, Bures sur Yvette (FR)

(73) Assignees: CLEANEA, Puteaux (FR); CERAM HYD, Ecuelles (FR)

( * ) Notice: Subject to any disclaimer, the term of this patent is extended or adjusted under 35 U.S.C. 154(b) by 0 days.

(21) Appl. No.: 14/006,295

(22) PCT Filed: Mar. 19, 2012

(86) PCT No.: PCT/FR2012/050571
§ 371 (c)(1),
(2), (4) Date: Sep. 19, 2013

(87) PCT Pub. No.: WO2012/127164
PCT Pub. Date: Sep. 27, 2012

(65) Prior Publication Data
US 2014/0138256 A1    May 22, 2014

(30) Foreign Application Priority Data
Mar. 22, 2011 (FR) ...................................... 11 52381

(51) Int. Cl.
*C02F 1/461* (2006.01)
*C25B 9/10* (2006.01)
*C02F 1/467* (2006.01)
*C25B 9/08* (2006.01)
*C25B 1/26* (2006.01)
*H01M 8/10* (2006.01)

(52) U.S. Cl.
CPC ................. *C25B 9/08* (2013.01); *C02F 1/4674* (2013.01); *C25B 1/26* (2013.01); *C25B 9/10* (2013.01); *C02F 2001/4619* (2013.01); *C02F 2001/46185* (2013.01); *C02F 2201/4611* (2013.01); *C02F 2201/46115* (2013.01); *H01M 2008/1095* (2013.01); *Y10T 29/49115* (2015.01)

(58) Field of Classification Search
CPC .............. C02F 2001/46185; C02F 2001/4619; C02F 2201/4611; C02F 2201/46115; C25B 9/08; C25B 9/10
See application file for complete search history.

(56) References Cited

U.S. PATENT DOCUMENTS

| | | | |
|---|---|---|---|
| 3,480,538 A | | 11/1969 | Sturm |
| 4,236,989 A | * | 12/1980 | Dahlberg ....................... 204/252 |
| 4,340,452 A | * | 7/1982 | deNora .......................... 205/525 |
| 4,734,181 A | * | 3/1988 | Cipriano ....................... 204/257 |
| 7,238,272 B2 | | 7/2007 | Sano |
| 2005/0121334 A1 | * | 6/2005 | Sumita .......................... 205/628 |
| 2011/0091789 A1 | | 4/2011 | Mofakhami et al. |

* cited by examiner

*Primary Examiner* — Keith Hendricks
*Assistant Examiner* — Salil Jain
(74) *Attorney, Agent, or Firm* — Seed IP Law Group PLLC (57) ABSTRACT

A three-chamber electrochemical cell comprises a central chamber, first and second chambers, and a central part for conveying a fluid solution into and out from the central chamber, the central part being symmetric with respect to a midplane of the cell. First and second electrodes of the cell are in surface contact with, respectively, first and second membranes. The first and second electrodes are produced from a porous electrically conductive material that absorbs mechanical stresses due to a first pressure differences between the first side chamber and the central chamber, and a second pressure difference between the second side chamber and the central chamber. The first and second electrodes are produced from a material including micrometer-sized metal beads compacted with one another leaving interstices between the beads, which form the pores of said electrodes.

10 Claims, 6 Drawing Sheets

SYMMETRIC ELECTROCHEMICAL CELL

FIELD OF THE INVENTION

The present invention relates to three-chamber electrochemical cells.

PRIOR ART

Three-chamber electrochemical cells are known in the prior art. They are used in applications where the use of three separate liquid streams is necessary or advantageous. One application example is the production of electrolyzed water, that is acidic on the one hand and basic on the other hand, as described in patent U.S. Pat. No. 7,238,272 and in patent application US 2005/0121334.

A three-chamber electrochemical cell comprises at least an anodic chamber with an anode, a cathodic chamber with a cathode, and a central chamber, located between the anodic chamber and the cathodic chamber. A first membrane separates the central chamber from the anodic chamber in a manner that is impermeable to water but not to ions; a second membrane separates the central chamber from the cathodic chamber in a manner that is impermeable to water but not to ions.

Each chamber of the electrochemical cell is adapted to the flow of liquids. The invention does not therefore relates to electrochemical cells supplied with gas and lacking chambers suitable for receiving a liquid, such as for example the cell described in patent U.S. Pat. No. 3,480,538. The flow of liquids which takes place within the three chambers, and in particular in the central chamber, has a significant influence on the efficiency and the service life of the cell. Indeed, a good distribution of the liquid stream over all of the membranes separating the chambers makes it possible to maximize the useful area thereof. Furthermore, the membranes are subjected to deformations due to pressure differences between the chambers. It would be possible to solve this problem by simply applying the same pressure in the various chambers. This solution can be envisaged in stationary operating regime, but pressure variations in the streams upstream and downstream of the chambers cannot be ruled out. Moreover, this condition of equality of the pressures is difficult to respect in transitional regimes, in particular during the start-up and shutdown of the electrochemical device.

There is therefore currently a need for a three-chamber electrochemical cell in which the circulation of the liquid in the central chamber is improved.

U.S. Pat. No. 4,734,181 describes an electrochemical cell unit that has a particular architecture.

It is to the inventors' credit to have designed an improved three-chamber electrochemical cell.

SUMMARY OF THE INVENTION

One subject of the present invention is a three-chamber electrochemical cell, comprising:
- a central chamber for transporting a fluid solution,
- a first side chamber comprising a first electrode, the first side chamber being separated from the central chamber by a first membrane that forms a partition between the first chamber and the central chamber, and
- a second side chamber comprising a second electrode, the second side chamber being separated from the central chamber by a second membrane that forms a partition between the second chamber and the central chamber, characterized in that it comprises a central section for transport, flow and diffusion of the fluid solution into the central chamber, said central section being symmetrical with respect to a mid-plane between the first and second membranes and parallel to said membranes, the three-chamber electrochemical cell consisting of two half-cells that are symmetrical with respect to the mid-plane, each half-cell comprising one of the side chambers and one of the membranes, the central chamber being formed by the assembly of the two half-cells and the central section being encapsulated in the central chamber between the two half-cells.

Another subject of the present invention is a process for manufacturing an electrochemical cell according to the invention, characterized in that it comprises the steps consisting in:
- providing first and second half-cells, that are symmetrical with respect to one another, each comprising at least one electrode and one membrane, and
- assembling said first and second half-cells by encapsulating the central section between the two half-cells.

Finally, a process for producing electrolyzed water using the electrochemical cell according to the invention, characterized in that:
- the central chamber is supplied with electrolyte, preferably an aqueous solution of sodium chloride;
- a voltage of 3 to 6 V is applied between the first and second electrodes;
- the first and second side chambers are supplied with water and electrolyzed water is withdrawn from the side chambers, the electrolyzed water produced in the first side chamber being acidic, whilst the electrolyzed water produced in the second side chamber is basic, is also one subject of the present invention.

BRIEF DESCRIPTION OF THE FIGURES

Other features and advantages of the invention will appear on examining the detailed description below, and appended drawings in which.

DETAILED DESCRIPTION OF THE INVENTION

In the present invention, an electrochemical cell denotes a device in which electrochemical reactions occur by the application of electrical energy or, conversely, which provide electrical energy as a result of electrochemical reactions. It may in particular be an electrolytic cell or a battery.

Figure 1:
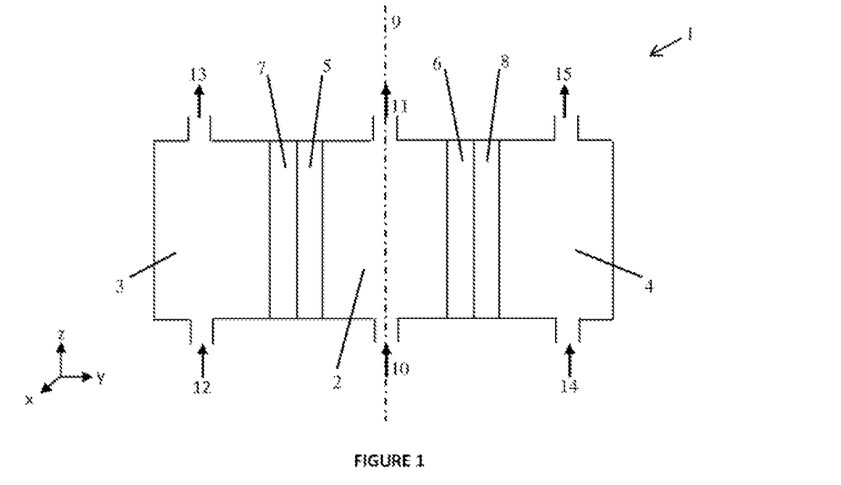
FIG. 1 schematically illustrates a three-chamber electrochemical cell.

FIG. 1 schematically illustrates a three-chamber electrochemical cell according to the invention. The cell 1 comprises a central chamber 2, a first side chamber 3 and a second side chamber 4. The central chamber 2 is separated from the first side chamber 3 by a first membrane 5. The central chamber 2 is also separated from the second side chamber 4 by a second membrane 6 parallel to the first membrane 5. The first chamber 3 comprises a first electrode 7 and the second chamber 4 comprises a second electrode 8. According to one preferred embodiment, which is represented in FIG. 1, the first electrode 7 is placed against the first membrane 5, and the second electrode 8 is placed against the second membrane 6. Moreover, the cell 1 is designed so that there is a mid-plane 9, located at equal distance between the first and second membranes and parallel to said membranes. In FIG. 1, this plane 9 is along the z (height) and x (depth) axes. The cell according to the invention comprises a central section for transport, flow and diffusion of the fluid solution into the central chamber, said central section being symmetrical with respect to the plane 9. Each chamber is provided with liquid fluid transport paths: in the central chamber 2, the liquid fluid can penetrate via the path 10 and exit via the path 11; in the first side chamber 3, the liquid fluid can penetrate via the path 12 and exit by the path 13; in the second side chamber 4, the liquid fluid can penetrate by the path 14 and exit by the path 15.

Figure 2:
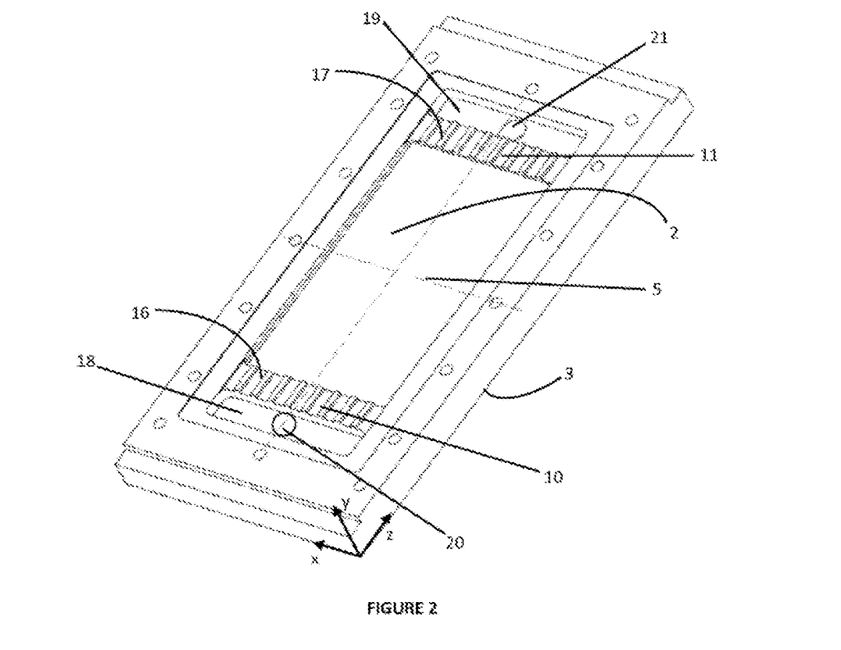
FIG. 2 represents a cross section of the cell, through its mid-plane.

Preferably, the central chamber of the cell according to the present invention comprises a fluid transport path that extends substantially over the entire width of the central chamber. FIG. 2 reveals a central half chamber, cut along the mid-plane of the cell. The first membrane 5 forms the partition between the central chamber 2, on top, and the first side chamber 3, here underneath, not visible. According to this preferred embodiment, the path 10 via which liquid fluid penetrates into the central chamber 2 extends substantially over the entire width of the central chamber 2. A series of channels 16, opening into the central chamber and distributed, preferably uniformly, over the entire width of the chamber, make it possible to homogenously distribute the liquid stream over the width. Preferably, the path 11 by which the liquid fluid exits from the central chamber 2 is designed in the same way, extending substantially over the entire width of the central chamber 2, and possessing a series of channels 17.

Moreover, the cell preferably comprises a buffer tank 18 upstream of the transport path 10. This buffer tank 18 is represented in FIG. 2. It has the role of improving the homogeneity of the distribution of the liquid stream in the direction of the width. Preferably, the cell also comprises a buffer tank 19 downstream of the liquid stream exit path 11. The hydraulic coupling of the central chamber may be achieved via the exits 20 and 21, which have been made respectively in the tanks 18 and 19. This coupling system has the advantage of being easy to achieve and of enabling the use of connections that are conventionally found commercially, for example screw connections. The position and/or shape of the connections has no influence on the distribution of the stream in the central chamber, which is an improvement compared to certain prior art devices. The buffer tanks 18 and 19 make it possible to guarantee a homogenous distribution of the electrolyte in the central chamber.

The cell according to the present invention comprises a central section that is symmetrical with respect to a mid-plane between the first and second membranes and parallel to said membranes. The role of this section is to transport the liquid stream in order to enable the flow thereof and the diffusion thereof into the central chamber toward the membranes. According to one preferred embodiment of the present invention, the central section of the cell comprises:
 a first porous sidewall in surface contact with the first membrane,
 a second porous sidewall in surface contact with the second membrane, and
 a set of linking elements between the two walls.

The set of linking elements, also referred to as linking ribs, is a set of solid elements that provides the central section with its mechanical stiffness. This set promotes the homogenous supplying of the membranes by the diffusion and dispersion of the liquid stream. The porosity of each wall of the central section has the main role of promoting a homogenous diffusion of the liquid fluid through these sidewalls toward the membranes.

The space in the central chamber is preferably substantially occupied in its entirety by the central section. The central section is preferably slightly compressed once in place in the cell.

Advantageously, the first and second walls of the central section of the cell according to the invention are made from a porous material that absorbs mechanical stresses due to respective pressure differences between the first chamber and the central chamber on the one hand, and the second chamber and the central chamber on the other hand. Preferably, the porous material is not conductive. It may be a plastic. The pores are of sufficient size so that the porous material is permeable to the liquid fluids of the central chamber at the operating pressure of the cell. In particular, the porous walls are capable of allowing ions to pass from the central chamber toward the side chambers. The pores preferably have a mean diameter of less than 200 µm (micrometers), more preferably between 10 µm and 160 µm, more preferably still between 50 µm and 100 µm. The porous material according to this variant of the invention has the role of withstanding the pressures which would otherwise be applied to the membranes, of absorbing the mechanical stresses that are exerted on the membranes and which could damage them. The porous material especially absorbs the variations in mechanical stresses that are exerted on the membranes. Owing to the use of a porous material, it is no longer necessary to use plates pierced with holes, as in the prior art, which result in isolated pressure differences on the membrane. These pressures exerted locally may cause the creep of the membrane through the holes, which, over time, may give rise to the perforation of the membrane.

Figure 3:
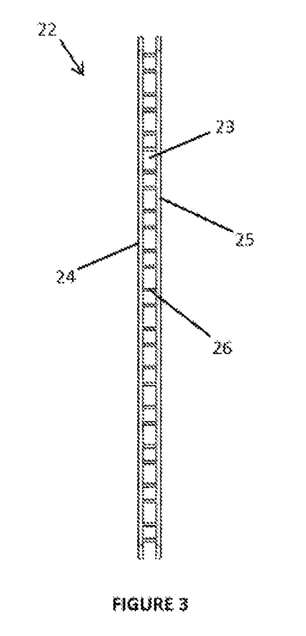
FIGS. 3, 4 and 5 represent one embodiment of the central section of the cell, respectively from the side, from the front and in perspective.
Figure 4:
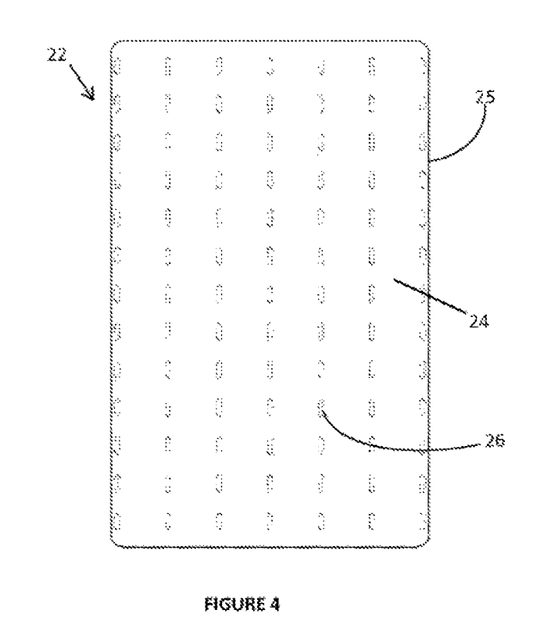
Figure 5:
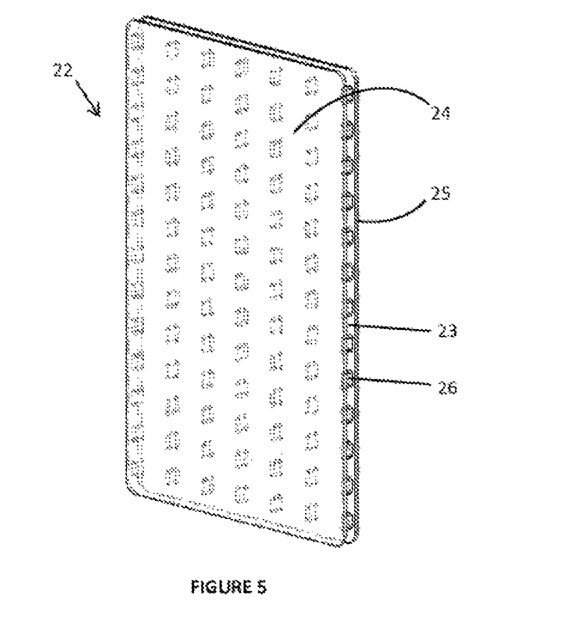

FIGS. 3, 4 and 5 represent one embodiment of the central section 22. The set of linking elements 23 comprises spacers 26 between the two sidewalls 24 and 25, and the walls 24 and 25 and the spacers 26 are produced from a single part made from one and the same block. The spacers may take on various forms, in particular the form of a ladder tread.

The central section is preferably made from a material that is inert with respect to the chemical species present in the liquid fluid, for example a sintered plastic such as a polyamide, for example nylon, polypropylene, ABS, a polycarbonate, a nylon composite or a polystyrene. The central section may be made from one and the same block or from several separate elements. The central section is chosen, for example, from:
 A sheet made of compressed fibrous material, the two faces of which constitute to the first and second sidewalls.
 An assembly composed of two layers of fibrous material and an element as represented in FIGS. 3, 4 and 5 inserted between these layers of fibrous material.
 A sheet of compressed foam, inserted between two walls made of porous plastic. The set of linking elements is formed by the network of the foam. Moreover, the compressed foam performs a spring effect making it possible to guarantee good pressing of the membranes against the electrodes.

A sheet of rigid porous polymer material, the two faces of which constitute the first and second sidewalls. In this case, the rigid porous polymer material may be manufactured according to techniques known to a person skilled in the art, for example by powder sintering or by stereolithography.

Figures 6, 7:
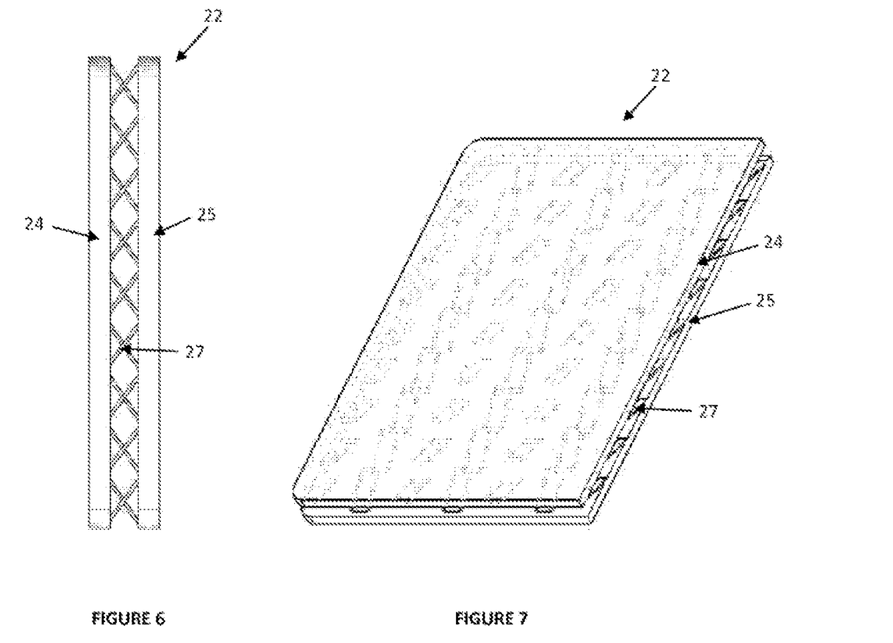
FIGS. 6, 7 and 8 represent another embodiment of the central section of the cell, respectively from the side, in perspective and from below.
Figure 8:
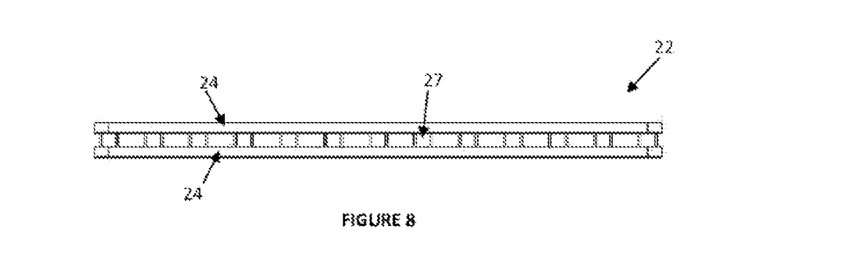

Two sheets made of porous plastic with, between them, spring elements. One embodiment is represented in FIGS. 6, 7 and 8. The two sidewalls 24 and 25 are equipped with strips 27 which bear against the wall that faces them. The set of strips 27 forms a spring element between the two walls 24 and 25.

According to one preferred embodiment of the present invention, the central section of the cell is made of a fibrous material that absorbs mechanical stresses due to respective pressure differences between the first chamber and the central chamber on the one hand, and the second chamber and the central chamber on the other hand.

The three-chamber electrochemical cell according to the invention comprises, besides the central chamber, a first side chamber and a second side chamber, each comprising an electrode. Depending on the type of chemical reaction that takes place at the electrode, the latter is referred to as an anode or cathode.

The membranes used in the present invention may be those conventionally used by a person skilled in the art in such electrochemical devices. They are preferably ion-exchange membranes. By definition, an ion-exchange membrane is a membrane that is permeable to anions (anionic membrane) and/or to cations (cationic membrane), the properties of which generally result from the presence of fixed electrical charges at sites. It may also be a bipolar membrane, consisting of one face that is permeable to anions and one face that is permeable to cations. The cationic membranes that can be used in the present invention are, for example, Nafion® membranes (sold by the company DuPont) and the membranes described in international patent application WO 2009/115732. The anionic membranes that can be used in the present invention are, for example, Nafion® modified by impregnation of $Na^+$ ions. Other membranes such as the CERAPEM membrane (sold by the company CeramHyd) may be in the three anionic, cationic and bipolar forms, and be used in this device.

The electrodes are formed from electrically conductive materials such as those conventionally used in the prior art. They may be made of gold, platinum, carbon fibers, graphite, nickel or titanium.

According to one embodiment of the present invention, the first and second electrodes of the cell are in surface contact with, respectively, the first and second membranes, and the first and second electrodes are made from a porous electrically conductive material that absorbs mechanical stresses due to respective pressure differences between the first chamber and the central chamber on the one hand, and the second chamber and the central chamber on the other hand. The pores of the material of the electrode preferably have a mean diameter of less than 200 µm (micrometers), more preferably between 10 µm and 160 µm, more preferably still between 50 µm and 100 µm. The use of a porous material has the advantage that the electrode diffuses the liquid and gaseous fluids of the chamber in which it is found in a much better manner, while having a smooth, continuous and homogenous surface. It is no longer necessary to design electrodes with orifices as in the prior art. These orifices, in addition to selectively allowing pressure differences on the membrane, have the drawback of reducing the useful area of the electrode.

The electrodes made of a porous electrically conductive material according to this embodiment may be manufactured according to conventional techniques known to a person skilled in the art. Preferably, the first and second electrodes are produced from a material consisting of micrometer-sized metal beads compacted with one another leaving interstices between the beads, which form the pores of said electrodes. Preferably, the metal of the beads is titanium. Titanium has the advantage of being an electrically conductive metal that is light and mechanically and chemically resistant. In to particular, it withstands chemical corrosion very well and is inert with respect to the electrochemical reactions that take place in the cell.

At the electrodes, a catalyst is preferably added so as to promote the desired electrochemical reactions. In the case of reactions of the chloride ions at the anode, the catalyst is preferably chosen from iridium oxide, ruthenium oxide, the mixture of iridium oxide and ruthenium oxide, and the mixture of iridium oxide, ruthenium oxide and titanium oxide. In the case of reactions of the sodium ions at the cathode, the catalyst is preferably platinum. The catalyst may be deposited, in the form of a thin layer, on the conductive material forming the electrode. However, in the case where the electrode is in direct contact with the membrane, it may be envisaged to deposit a thin layer of catalyst on said membrane, on the face in contact with the electrode.

In the embodiments from the prior art, the assembly of such cells requires the stacking of a certain number of elements, in particular of at least one central element that defines the central chamber of the cell, equipped with end fittings that enable the inlet and outlet of a liquid stream in this chamber.

The inventors have observed that these assemblies according to the prior art exhibited drawbacks. Specifically, it is necessary for the various elements that form them to be positioned precisely with respect to one another. The design of the cells according to the prior art does not make it possible to verify good connections during the assembly operations. It is also necessary for the joins to be made uniformly so as to avoid, on the one hand, leaks and, on the other hand, heterogenous mechanical stresses exerted on the parts which could cause the premature aging thereof. Moreover, the maintenance of the cell requires a complete disassembly thereof. It is not possible to disassemble only one portion of the cell since the assembly is firmly joined together.

According to the present invention, the three-chamber electrochemical cell consists of two half-cells that are symmetrical with respect to the mid-plane, each half-cell comprising one of the side chambers and one of the membranes, characterized in that the central chamber is formed by the assembly of the two half-cells, the central section being encapsulated in the central chamber between the two half-cells.

Each half-cell may comprise a body, a membrane, an electrode, a connection frame and a cover. A window may advantageously be made in the body so as to be able to house the membrane, the electrode and the connection frame. The cover may then be fitted on top of these elements so as to form the side chamber and seal the half-cell. The side chamber thus consists of the space between the cover and the electrode.

Exits may be made in the cover in order to enable the side chamber to be supplied with fluid. Moreover, the connection frame may preferably be placed in contact with the electrode and comprise a portion located on the outside of the half-cell, making it possible to make an electrical connection. Advantageously, an opening is made in the cover and a portion of the connection frame is fitted into this opening.

The cover may advantageously be attached directly to the body, by virtue for example of a screw system. Thus, the half-cell forms a firmly joined together assembly, which can be assembled and disassembled independently of the other portions of the cell, in particular of the other half-cell. Furthermore, the leaktightness of the half-cell with respect to the outside can be achieved by virtue of a seal.

Figure 9:
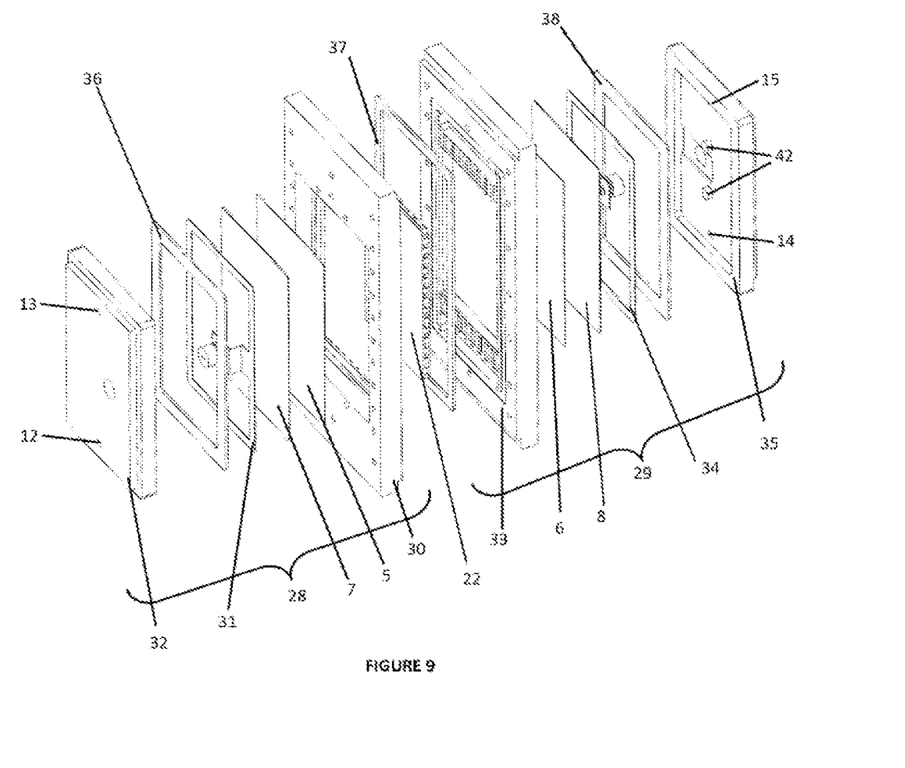
FIG. 9 represents an exploded view of one embodiment of the cell according to the invention.
Figure 10:
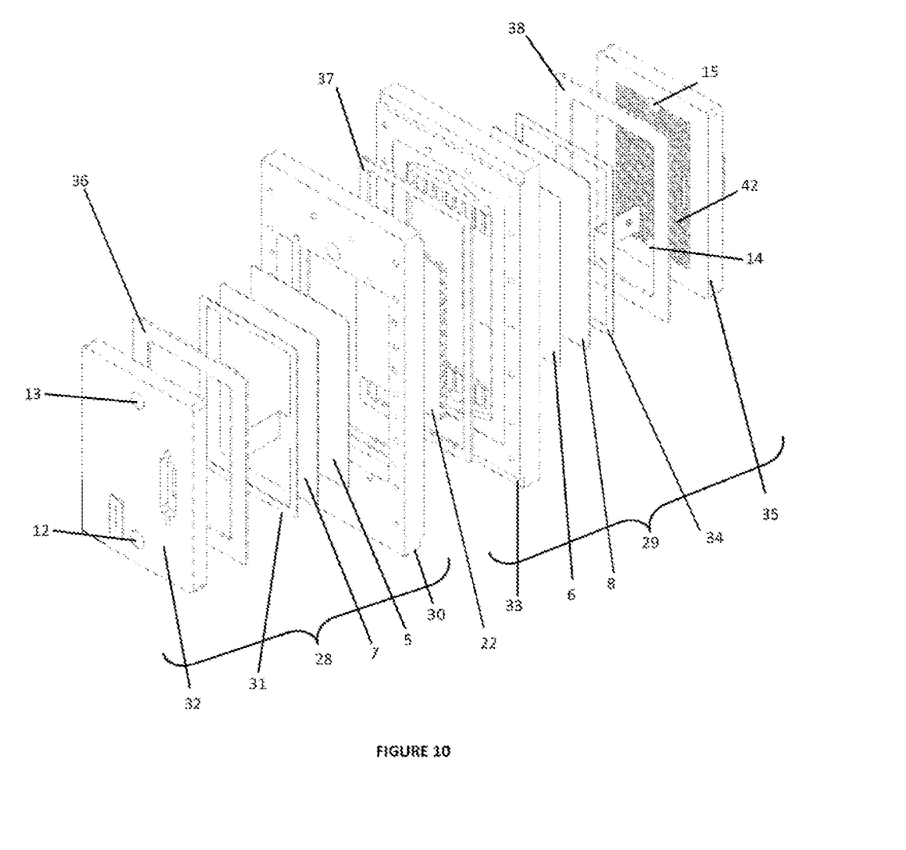
FIG. 10 represents an exploded view of another embodiment of the cell according to the invention.

FIGS. 9 and 10 represent an exploded view of two embodiments of the cell according to the invention. Each half-cell (28 and 29) is composed of at least 5 elements. The first half-cell 28 consists of a body 30, a first membrane 5, a first electrode 7, a connection frame 31 and a cover 32. In a symmetrical manner, the second half-cell 29 consists of a body 33, a second membrane 6, a second electrode 8, a connection frame 34 and a cover 35. Each half-cell can be assembled independently of the other.

For convenience, in the remainder of the description, the elements will be cited in the form X/Y, X and Y being corresponding elements, respectively in the first half-cell and in the second-half-cell.

In the body 30/33, a window is made so as to be able to house the membrane 5/6, the electrode 7/8 and the connection frame 31/34. The cover 32/35 is then fitted on top of these elements so as to seal the half-cell.

According to one embodiment of the present invention, the cover 32/35 has one or more contacts 42. FIG. 9 represents an embodiment in which each cover 32/35 has two contacts 42. FIG. 10 represents an embodiment in which each cover 32/35 has a set of contacts 42. The height of these contacts is adapted to the thickness of the side chambers, so that, when the cell is sealed, the top of the contacts is found against the electrode 7/8. These contacts thus make it possible to reinforce the electrodes.

Figure 11:
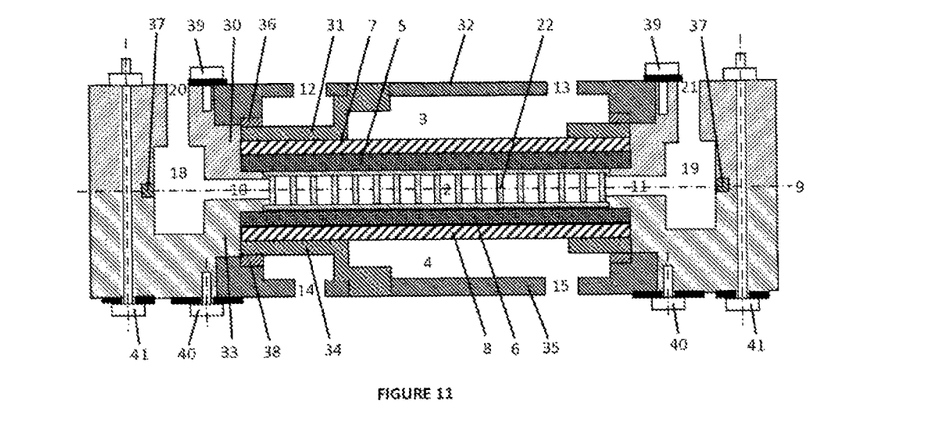
FIG. 11 represents a longitudinal cross-sectional view of one embodiment of the cell according to the invention.

FIG. 11 schematically shows a longitudinal cross-sectional view of an embodiment of the cell according to the invention. The assembly of the various elements (body 30/33, membrane 5/6, electrode 7/8, connection frame 31/34 and cover 32/35) forms the side chamber 3/4. The cover 32/35 is attached to the body 30/33 by virtue of a screw system 39/40. Thus, each half-cell 28/29 forms a firmly joined together assembly.

The leaktightness of the half-cell 28/29 with respect to the outside is preferably achieved by virtue of a seal 36/38. The leaktightness of the half-cell 28/29 with respect to the central chamber is, on the other hand, obtained according to this embodiment by the compression of the various elements (membrane 5/6, electrode 7/8, connection frame 31/34 and seals 36/38) between the body 30/33 and the cover 32/35, the compressive stress being imparted by the screw system 39/40.

From an electrical connection viewpoint, the connection frame 31/34 is in contact with the electrode 7/8 and has a region that leads to the outside of the cover 32/35, enabling an electrical connection to be made. From a hydraulic coupling viewpoint, exits 12 and 13/14 and 15 are made respectively in the covers 32/35 in order to supply the side chambers 3/4. This coupling system has the advantage of being easy to achieve and of enabling the use of connections that are conventionally found commercially, for example screw connections.

The geometry of the electrochemical cell according to this embodiment of the present invention additionally has the advantage of being compatible with a conventional machining process. Each mechanical part has a simple shape that can be obtained by conventional machining, that does not require the use of costly and/or complex tools, such as injection molds. Preferably, the body and the cover of the half-cell are made from a plastic that is resistant to the chemicals used or generated by the electrochemical process.

Another subject of the present invention is a process for manufacturing an electrochemical cell according to the invention, characterized in that it comprises the steps consisting in:
providing first and second half-cells, that are symmetrical with respect to one another, each comprising at least one electrode and one membrane, and
assembling said first and second half-cells by encapsulating the central section between the two half-cells.

In FIG. 11, it can be seen that the shape of the half-cell is designed so that, when two half-cells are assembled, a central chamber 2 is formed. The central section 22 is encapsulated in the central chamber between the two half-cells. Preferably, the central section 22 has a thickness equal to the spacing between the two membranes 5 and 6, resulting from the assembly of the two bodies 30 and 33. The leaktightness of the central chamber 2 with respect to the outside is preferably achieved by virtue of a seal 37 and a screw system 41.

The three-chamber electrochemical cell according to the present invention can advantageously be used in a process for producing electrolyzed water that is acidic on the one side and basic on the other side.

Another subject of the present invention is therefore a process for producing electrolyzed water using the electrochemical cell according to the present invention, characterized in that:
the central chamber is supplied with an electrolyte, preferably an aqueous solution of sodium chloride;
a voltage of 3 to 6 V is applied between the first and second electrodes;
the first and second side chambers are supplied with water and electrolyzed water is withdrawn from the side chambers,
the electrolyzed water produced in the first side chamber being acidic, whilst the electrolyzed water produced in the second side chamber is basic.

The positive electrode acts as the anode; the negative electrode acts as the cathode. The Cl⁻ ions are attracted by the anode and pass through the membrane to arrive in the anode chamber. In the same manner, the Na⁺ ions are attracted by the cathode and pass through the membrane in order to arrive in the cathode chamber.

From an electrochemical viewpoint, at the anode, various reactions are witnessed: on the one hand the electrolysis of water, resulting in the formation of dioxygen, on the other hand the reaction of the chloride ions, resulting in the formation of hypochlorous acid HClO:

$$H_2O \rightarrow 2H^+ + \tfrac{1}{2}O_2 + 2e^-$$

$$Cl^- + Cl^- \rightarrow Cl_2 + 2e^-$$

$$Cl_2 + H_2O \rightarrow HCl + HClO$$

$$Cl^- + OH^- \rightarrow HClO + 2e^-$$

The electrolyzed water obtained in the anode side chamber is acidic. Preferably, its pH is between 3 and 6. It contains hypochlorous acid HClO in a concentration preferably between 80 ppm and 400 ppm, more preferably between 100 ppm and 300 ppm, and more preferably still around 150 ppm. This aqueous solution has significant bactericidal properties and can advantageously be used as a disinfectant product.

The concentration of hypochlorous acid in the electrolyzed water obtained in the anode side chamber depends on the operating parameters of the cell, in particular on the voltage and on the current applied, and also on the concentration of electrolyte in the central chamber and on the flow rate of the streams in the three chambers. It also depends on the intrinsic technical features of the cell, and in particular the dimension of the active surface of the membranes and of the electrodes. The electrochemical cell according to the present invention has the advantage of having good energy efficiency. Notably, owing to the present electrochemical cell, it is possible to achieve very high concentrations of hypochlorous acid per unit area of active membrane surface.

At the cathode, the electrolysis of water with formation of dihydrogen is witnessed, with production of sodium hydroxide NaOH:

$$2H_2O + 4e^- \rightarrow 4H_2 + 2OH^-$$

$$Na^+ + H_2O + 1e^- \rightarrow NaOH + \tfrac{1}{2}H_2$$

$$NaOH \rightarrow Na^+ + OH^-$$

The electrolyzed water obtained in the cathode side chamber is basic. Preferably, its pH is between 11 and 12.5. Due to its alkalinity, this aqueous solution has an emulsifying effect on soiling containing oils and/or proteins. It can advantageously be used as a cleaning product.

EXAMPLES

The electrochemical cell represented in FIGS. 9 and 11 is equipped:
with a T1 grade porous titanium electrode having a porosity of 100 µm and a permeability of 800 m³/h·m²·kPa), and
with two CERAPEM® 310 membranes.

As catalysts, $IrO_2$ was deposited on the anode and Pt on the cathode. The membranes and the electrodes have an area of 160 cm².

The operating parameters are the following:
temperature (of the liquid streams) 14° C.;
pressure in the central chamber: 1 bar;
flow rate of aqueous solution of NaCl (300 g/l) in the central chamber: 100 ml/min;
flow rate of water in each side chamber: 0.7 l/min;
current density: 0.15 A/cm² (i.e. a total of 24 A);
voltage: 4.7 V.

The use of this cell makes it possible to obtain:
Anode side (for a flow rate of 0.7 l/min):
HClO concentration: 317 ppm
pH=2.72
volume of oxygen produced=40 ml/min
Cathode side (for a flow rate of 0.7 l/min):
pH=11.37
volume of hydrogen produced=170 ml/min.

The invention claimed is:
1. A three-chamber electrochemical cell, comprising:
a central chamber for transporting a fluid solution,
a first side chamber comprising a first electrode,
a first membrane separating the first side chamber from the central chamber and forming a partition between the first chamber and the central chamber,
a second side chamber comprising a second electrode,
a second membrane separating the second side chamber from the central chamber and forming a partition between the second chamber and the central chamber, and
a central section for transport, flow and diffusion of the fluid solution into the central chamber, said central section being symmetrical with respect to a mid-plane between the first and second membranes and parallel to said membranes, the three-chamber electrochemical cell including two half-cells that are symmetrical with respect to the mid-plane, each half-cell comprising one of the side chambers and one of the membranes, the central chamber being formed by the assembly of the two half-cells and the central section being encapsulated in the central chamber between the two half-cells, wherein:
the first and second electrodes of the cell are in surface contact with, respectively, the first and second membranes, and the first and second electrodes are produced from a porous electrically conductive material that absorbs mechanical stresses due to a first pressure difference between the first side chamber and the central chamber, and a second pressure difference between the second side chamber and the central chamber on the other hand; and
the first and second electrodes are produced from a material including micrometer-sized metal beads compacted with one another leaving interstices between the beads, which form the pores of said electrodes.
2. The cell as claimed in claim 1, wherein the central chamber of the cell comprises a fluid transport path that extends substantially over an entire width of the central chamber.
3. The cell as claimed in claim 2, comprising a buffer tank upstream of the transport path.
4. The cell as claimed in claim 1, wherein the central section of the cell comprises:
a first porous sidewall in surface contact with the first membrane,
a second porous sidewall in surface contact with the second membrane, and
a set of linking elements between the two walls.
5. The cell as claimed in claim 4, wherein the first and second walls of the central section of the cell are made from a porous material that absorbs mechanical stresses due to a first pressure difference between the first side chamber and the central chamber, and a second pressure difference between the second side chamber and the central chamber.
6. The cell as claimed in claim 4, wherein the set of linking elements comprises spacers between the two sidewalls, and the walls and spacers are produced from a single block.
7. The cell as claimed in claim 1, wherein the central section is made of a fibrous material that absorbs mechanical stresses due to a first pressure difference between the first side chamber and the central chamber, and a second pressure difference between the second side chamber and the central chamber.
8. The cell as claimed in claim 1, wherein the metal of the beads is titanium.
9. A process,
manufacturing an electrochemical cell that includes:
a central chamber for transporting a fluid solution,
a first side chamber comprising a first electrode,
a first membrane separating the first side chamber from the central chamber and forming a partition between the first chamber and the central chamber,
a second side chamber comprising a second electrode,
a second membrane separating the second side chamber from the central chamber and forming a partition between the second chamber and the central chamber, and
a central section for transport, flow and diffusion of the fluid solution into the central chamber, said central section being symmetrical with respect to amid-plane between the first and second membranes and parallel to said membranes, the three-chamber electrochemical cell including two half-cells that are symmetrical with respect to the mid-plane, each half-cell comprising one of the side chambers and one of the membranes, the central chamber being formed by the assembly of the two half-cells and the central section being encapsulated in the central chamber between the two half-cells, wherein:

the first and second electrodes of the cell are in surface contact with, respectively, the first and second membranes, and the first and second electrodes are produced from a porous electrically conductive material that absorbs mechanical stresses due to a first pressure difference between the first side chamber and the central chamber, and a second pressure difference between the second side chamber and the central chamber on the other hand;

the first and second electrodes are produced from a material including micrometer-sized metal beads compacted with one another leaving interstices between the beads, which form the pores of said electrodes; and the manufacturing includes
providing first and second half-cells that are symmetrical with respect to one another, each comprising at least one electrode and one membrane, and
assembling said first and second half-cells by encapsulating the central section between the two half-cells.

10. A process, comprising:
producing electrolyzed water using a three-chambered electrochemical cell that includes:
a central chamber for transporting a fluid solution,
a first side chamber comprising a first electrode,
a first membrane separating the first side chamber from the central chamber and forming a partition between the first chamber and the central chamber,
a second side chamber comprising a second electrode,
a second membrane separating the second side chamber from the central chamber and forming a partition between the second chamber and the central chamber, and
a central section for transport, flow and diffusion of the fluid solution into the central chamber, said central section being symmetrical with respect to a mid-plane between the first and second membranes and parallel to said membranes, the three-chamber electrochemical cell including two half-cells that are symmetrical with respect to the mid-plane, each half-cell comprising one of the side chambers and one of the membranes, the central chamber being formed by the assembly of the two half-cells and the central section being encapsulated in the central chamber between the two half-cells, wherein:

the first and second electrodes of the cell are in surface contact with, respectively, the first and second membranes, and the first and second electrodes are produced from a porous electrically conductive material that absorbs mechanical stresses due to a first pressure difference between the first side chamber and the central chamber, and a second pressure difference between the second side chamber and the central chamber on the other hand;

the first and second electrodes are produced from a material including micrometer-sized metal beads compacted with one another leaving interstices between the beads, which form the pores of said electrodes;

the central chamber is supplied with an electrolyte;

a voltage of 3 to 6 V is applied between the first and second electrodes;

the first and second side chambers are supplied with water and electrolyzed water is withdrawn from the side chambers, and the electrolyzed water produced in the first side chamber is acidic, whilst the electrolyzed water produced in the second side chamber is basic.

* * * * *